(12) United States Patent
Kinne et al.

(10) Patent No.: US 11,820,439 B2
(45) Date of Patent: Nov. 21, 2023

(54) POWER-ASSIST ASSEMBLY

(71) Applicant: Steering Solutions IP Holding Corporation, Saginaw, MI (US)

(72) Inventors: Troy M. Kinne, Freeland, MI (US); Rodney M. Sanderson, Midland, MI (US); Christopher A. Fall, Vassar, MI (US); Rick A. Light, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 460 days.

(21) Appl. No.: 17/123,638

(22) Filed: Dec. 16, 2020

(65) Prior Publication Data
US 2022/0185362 A1 Jun. 16, 2022

(51) Int. Cl.
*B62D 5/04* (2006.01)
*B62D 3/12* (2006.01)
*F16H 57/02* (2012.01)

(52) U.S. Cl.
CPC .......... B62D 5/0403 (2013.01); B62D 3/126 (2013.01); F16H 57/02 (2013.01); *F16H 2057/02034* (2013.01); *F16H 2057/02082* (2013.01)

(58) Field of Classification Search
CPC ....... B62D 5/0403; B62D 3/126; F16H 57/02; F16H 2057/02034; F16H 2057/02082
See application file for complete search history.

(56) References Cited

U.S. PATENT DOCUMENTS

| | | | |
|---|---|---|---|
| 6,150,375 A * | 11/2000 | Audia | C07F 5/025 546/101 |
| 6,330,929 B1 * | 12/2001 | Gierc | B62D 5/22 180/428 |
| 7,334,660 B2 * | 2/2008 | Damore | B62D 5/22 180/428 |
| 10,259,490 B2 * | 4/2019 | Zuzelski | B62D 3/126 |
| 10,988,171 B2 * | 4/2021 | Sovern | B62D 7/163 |
| 2015/0251687 A1 * | 9/2015 | Minami | B62D 3/12 74/422 |
| 2015/0266500 A1 * | 9/2015 | Zaike | B62D 3/12 74/422 |
| 2023/0110871 A1 * | 4/2023 | LaGana | F16J 3/04 280/93.515 |

FOREIGN PATENT DOCUMENTS

| DE | 19900694 B4 | 11/2015 |
|---|---|---|
| DE | 102018130382 A1 | 6/2019 |

OTHER PUBLICATIONS

Office Action regarding corresponding DE App. No. 10 2021 132 900.0; dated Mar. 17, 2023.

\* cited by examiner

*Primary Examiner* — Tony H Winner
(74) *Attorney, Agent, or Firm* — Dickinson Wright PLLC

(57) ABSTRACT

A power-assist assembly comprising a housing including a drive axle portion extending between a pair of extension sleeve connection ends spaced along a first axis and an input gear portion extending along a second axis transverse to the first axis. A gear assist housing is connected to the input gear portion. A boot assembly connected to at least one of the extension sleeve connection ends. The boot assembly includes an extension sleeve connected to the extension sleeve connection end, a boot sleeve connected to the extension sleeve and spaced from the extension sleeve connection end of the housing by at least a portion of a length of the extension sleeve, and a boot retaining ring connected to the boot sleeve opposite the extension tube.

20 Claims, 9 Drawing Sheets

US 11,820,439 B2

POWER-ASSIST ASSEMBLY

FIELD OF THE INVENTION

The embodiments described herein relate to vehicle steering systems and, more particularly, to a steering system that includes a power-assist assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire (SbW) and driver interface steering. Often times, these various steering schemes include an electric power steering (EPS) system including components such as steering wheel, column, rack-pinion gear, electric motor actuator etc. The EPS helps the operator to steer a vehicle by providing necessary assist torque. The assist torque is based on an operator's applied torque. In a steady-state sense, the operator torque and assist torque counter the rack force generated because of tire-road interaction.

A typical SbW system includes a road-wheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the operator. Alternatively, the handwheel angle and vehicle speed can also be used to generate desired torque feel to the operator. The angle from HWA unit is sent to the RWA unit which performs position control to control rack travel. While RWA units provide operational benefits, they are oftentimes limited by packaging requirements. For example, typical RWA units require a specific assembly within the vehicle, such that there is limited flexibility in packaging and operational parameters.

Accordingly, as some end use applications for RWA units and other EPS system components have packaging and operational limitations. Thus, improvements in the RWA unit configuration and other EPS system components continue to be of interest.

SUMMARY

In accordance with one aspect of the invention, a power-assist assembly is provided. The power-assist assembly comprises a housing including a drive axle portion extending between a pair of extension sleeve connection ends spaced along an axis for locating a provided steering rack. A boot assembly is connected to at least one of the extension sleeve connection ends. The boot assembly comprises an extension sleeve operatively connected to the extension sleeve connection end. The boot assembly further comprises a boot sleeve operatively connected to the extension sleeve and spaced from the extension sleeve connection end of the housing by at least a portion of a length of the extension sleeve. The boot assembly further comprises a boot retaining ring operatively connected to the boot sleeve.

In accordance with another aspect of the invention, a power-assist assembly is provided. The power-assist assembly comprises a housing including a drive axle portion extending between a pair of extension sleeve connection ends spaced along a first axis for locating a provided steering rack and an input gear portion extending along a second axis for locating a provided input gear. A boot assembly is connected to at least one of the extension sleeve connection ends. The boot assembly comprises an extension sleeve operatively connected to the extension sleeve connection end. The boot assembly further comprises a boot sleeve operatively connected to the extension sleeve and spaced from the extension sleeve connection end of the housing by at least a portion of a length of the extension sleeve. The boot assembly further comprises a boot retaining ring operatively connected to the boot sleeve.

In accordance with another aspect of the invention, a power-assist assembly is provided. The power-assist assembly comprises a housing including a drive axle portion extending between a pair of extension sleeve connection ends spaced along a first axis and an input gear portion extending along a second axis transverse to the first axis. A gear assist housing is connected to the input gear portion. A steering rack is located in the drive axle portion, an input gear is located in the input gear portion, and a gear assist assembly is located in the gear assist housing. A boot assembly is connected to at least one of the extension sleeve connection ends. The boot assembly comprises an extension sleeve operatively connected to the extension sleeve connection end. The boot assembly further comprises a boot sleeve operatively connected to the extension sleeve and spaced from the extension sleeve connection end of the housing by at least a portion of a length of the extension sleeve. The boot assembly further comprises a boot retaining ring operatively connected to the boot sleeve.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
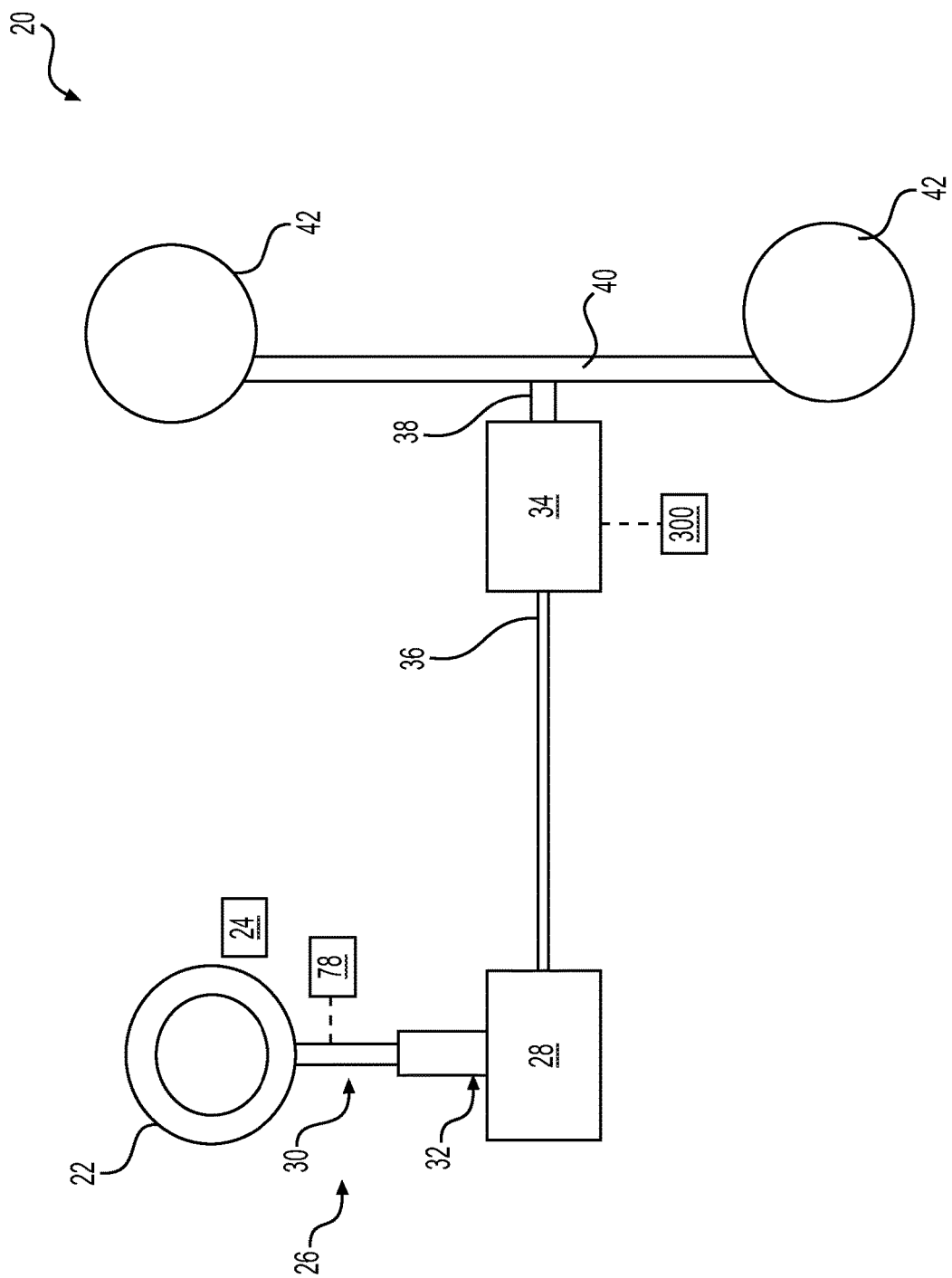
FIG. 1 schematically illustrates a power steering system including a power assist assembly according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire (SbW) and driver interface steering. Often times, these various steering schemes include an electric power steering (EPS) system including components such as steering wheel, column, rack-pinion gear, electric motor actuator etc. The EPS helps the operator to steer a vehicle by providing necessary assist torque. The assist torque is based on an operator's applied torque. In a steady-state sense, the operator torque and assist torque counter the rack force generated because of tire-road interaction.

A typical SbW system includes a road-wheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the operator. Alternatively, the handwheel angle and vehicle speed can also be used to generate desired torque feel to the operator. The angle from the HWA unit is sent to the RWA unit, which performs position control-to-control rack travel. While RWA units provide operational benefits, they are oftentimes limited by packaging requirements. For example, typical RWA units require a specific assembly within the vehicle, such that there is limited flexibility in packaging and operational parameters.

Although existing solutions have provided a certain amount of workability, improvements in power steering system design and adaptability continue to be of interest. Accordingly, systems and methods, such as those described herein, configured to provide improved packaging and operational framework of a power steering system, may be desirable. In some embodiments, the systems and methods described herein may be configured to provide improvements to the operational framework of the power steering system.

Referring now to the drawings, where the various embodiments are shown and described herein, without limiting same, FIGS. 1-9 illustrate embodiments of a system, method and apparatus for the power steering system that permits assembly in multiple arrangements that result in improved packaging and other operational benefits.

Figure 8:
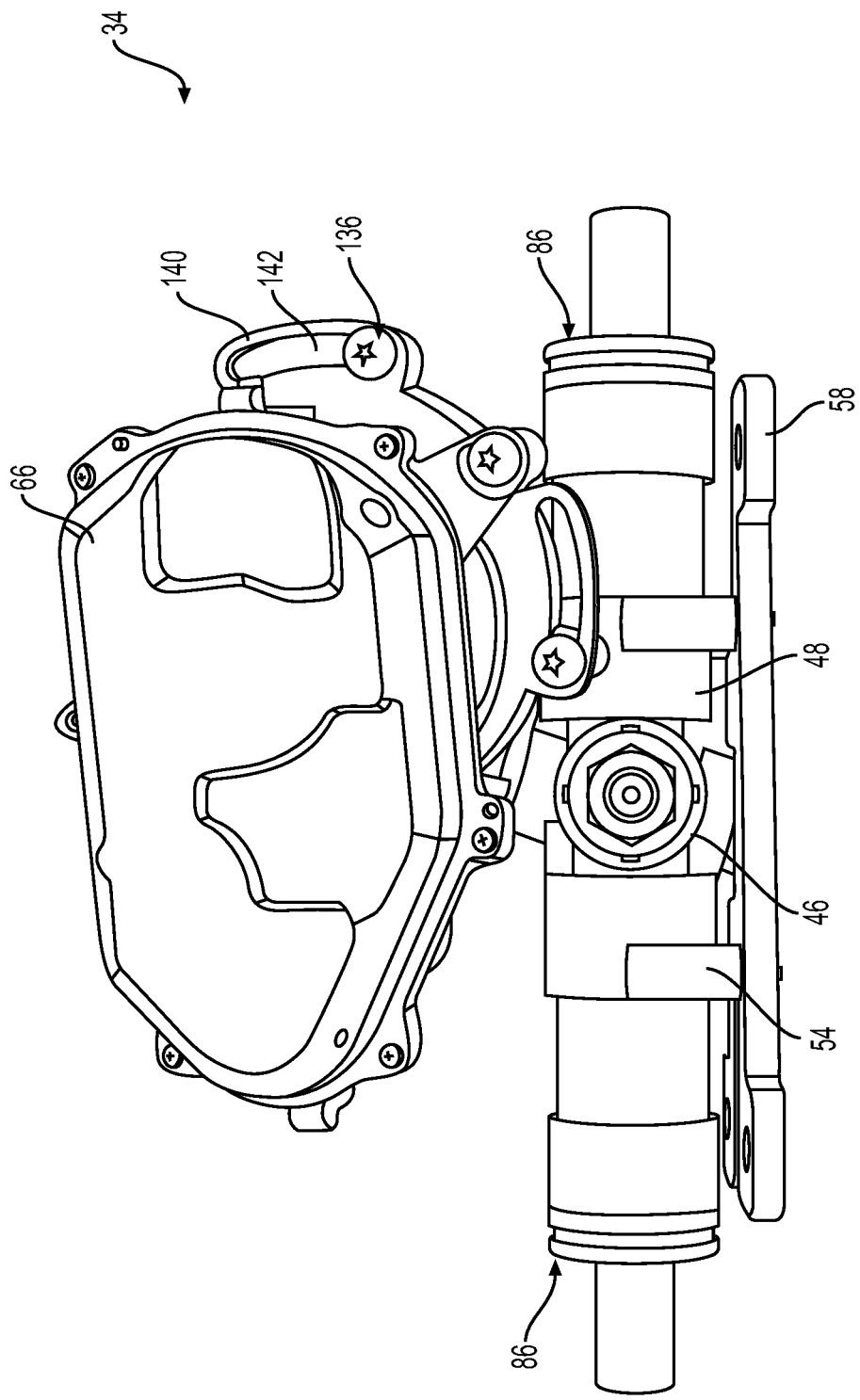
FIG. 8 is a top view of the power assist assembly according to the principles of the present disclosure.

Referring initially to FIG. 1, the power steering system 20 is generally illustrated. The power steering system 20 may be configured as a driver interface steering system, an autonomous driving system, or a system that allows for both driver interface and autonomous steering. The steering system may include an input device 22, such as a steering wheel or other HWAs, wherein a driver may mechanically provide a steering input by turning the steering wheel. An airbag device 24 may be located on or near the input device 22. A steering column 26 extends along an axis from the input device 22 to an output assembly 28. The steering column 26 may include at least two axially adjustable parts, for example, a first portion 30 and a second portion 32 that are axially adjustable with respect to one another. The output assembly 28 may include a pinion shaft assembly, an I-shaft, a cardan joint, steer-by-wire components or any other features conventionally located opposite the input device 22. The output assembly 28 may connect to a power-assist assembly 34 (RWA) via a connection 36. The connection 36 may be one of a steering gear input shaft, a continuation of the pinion shaft assembly, or wired or wireless digital communication protocols. As will be described in greater detail below, behavior of the power-assist assembly 34 may be controlled via a control system 300 (FIG. 8).

The power-assist assembly 34 may include steering gear components 38 such as a rack-and-pinion, a recirculating ball-type steering gear, or any other types of steering gear assemblies associated with autonomous, driver-interface steering systems, or combinations thereof. The power-assist assembly 34 may then operably connect to a drive axle assembly 40 via the steering gear components 38. In operation, actuation of the driver input 22 causes a responsive movement of the power-assist assembly 34 and causes the drive axle assembly 40 to turn driving wheels 42 of an associated vehicle. The power-assist assembly 34 may be part of a single pinion electronically assisted power steering (SPEPS) system.

Figure 2:
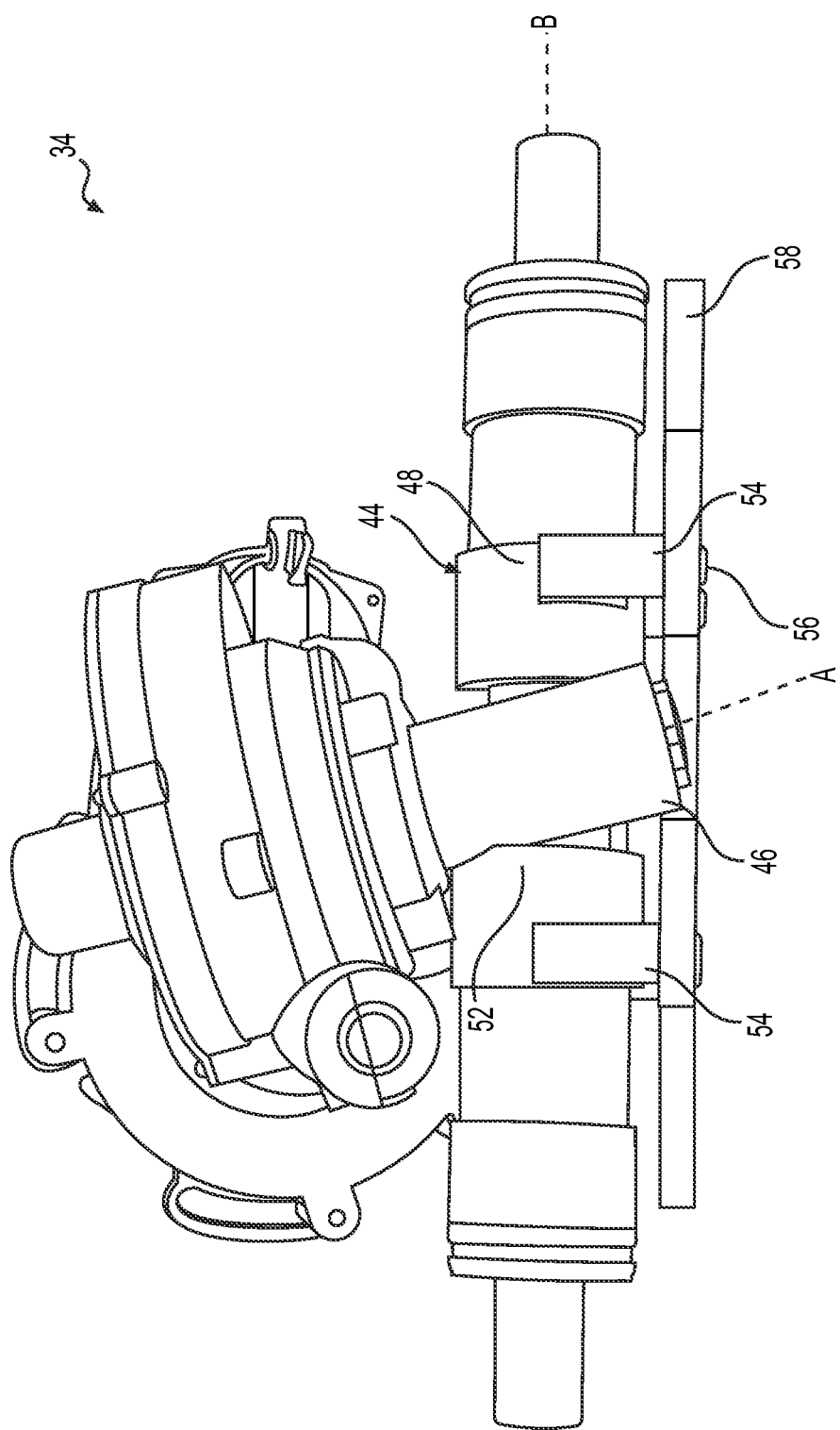
FIG. 2 is a bottom view of the power assist assembly according to the principles of the present disclosure.
Figure 4:
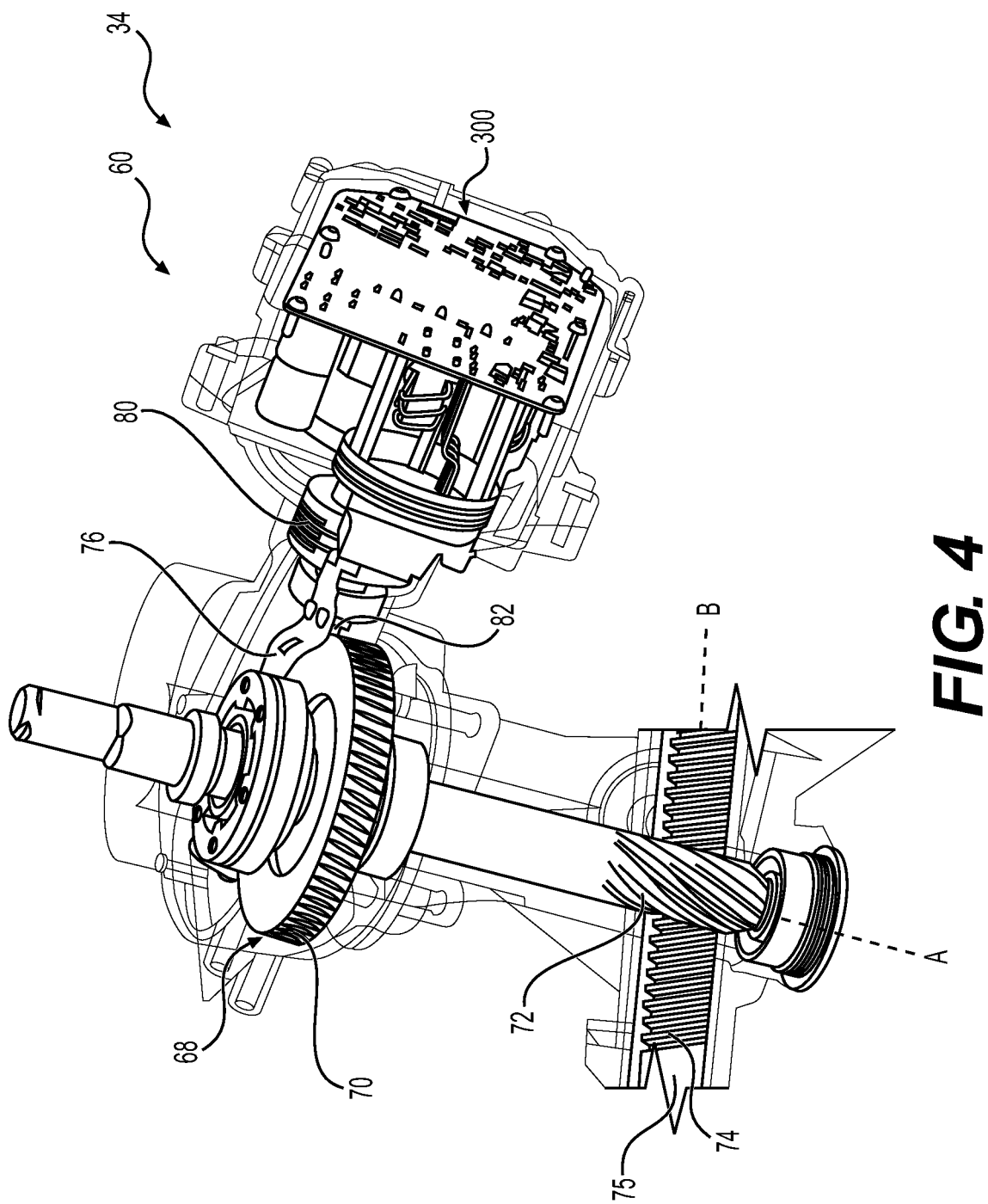
FIG. 4 is an internal view of the power assist assembly according to the principles of the present disclosure.

With reference now to FIG. 2, the power-assist assembly 34 in accordance with the present invention is generally illustrated. The power-assist assembly 34 includes a housing 44, for example, a die cast housing. The housing 44 includes an input gear portion 46 and a drive axle portion 48. The input gear portion 46 defines an internal surface (FIG. 4) extending about a first axis A and the drive axle portion 48 defines an internal surface 50 (FIGS. 4 and 6) extending about a second axis B. The first axis A is transverse to the second axis B and the internal surfaces merge at a steering gear interface portion 52. The housing 44 locates and protects portions of the power steering system 20. For example, the input gear portion 46 houses the output assembly 28 (e.g., an input gear) of the steering column assembly 26, and the output assembly 28 may include a pinion gear 72 (FIG. 4). The drive axle portion 48 may include portions of the drive axle 40 and the steering gear components 38. For example, the steering gear components 38 may include a rack gear 74 (FIG. 4) that is intermeshed with the pinion gear 72 in the interface portion 52 of the housing 44. The housing 44 further includes at least one mounting portion 54. For example, the at least one mounting portion 54 may include a plurality, such as four, mounting portions 54, with two mounting portions 54 extending from opposite sides of the drive axle portion 48. The mounting portions 54 may define apertures for receiving bolts 56 that are further connected to a mounting bracket 58 that connects the housing 44 to an associated vehicle.

Figure 3:
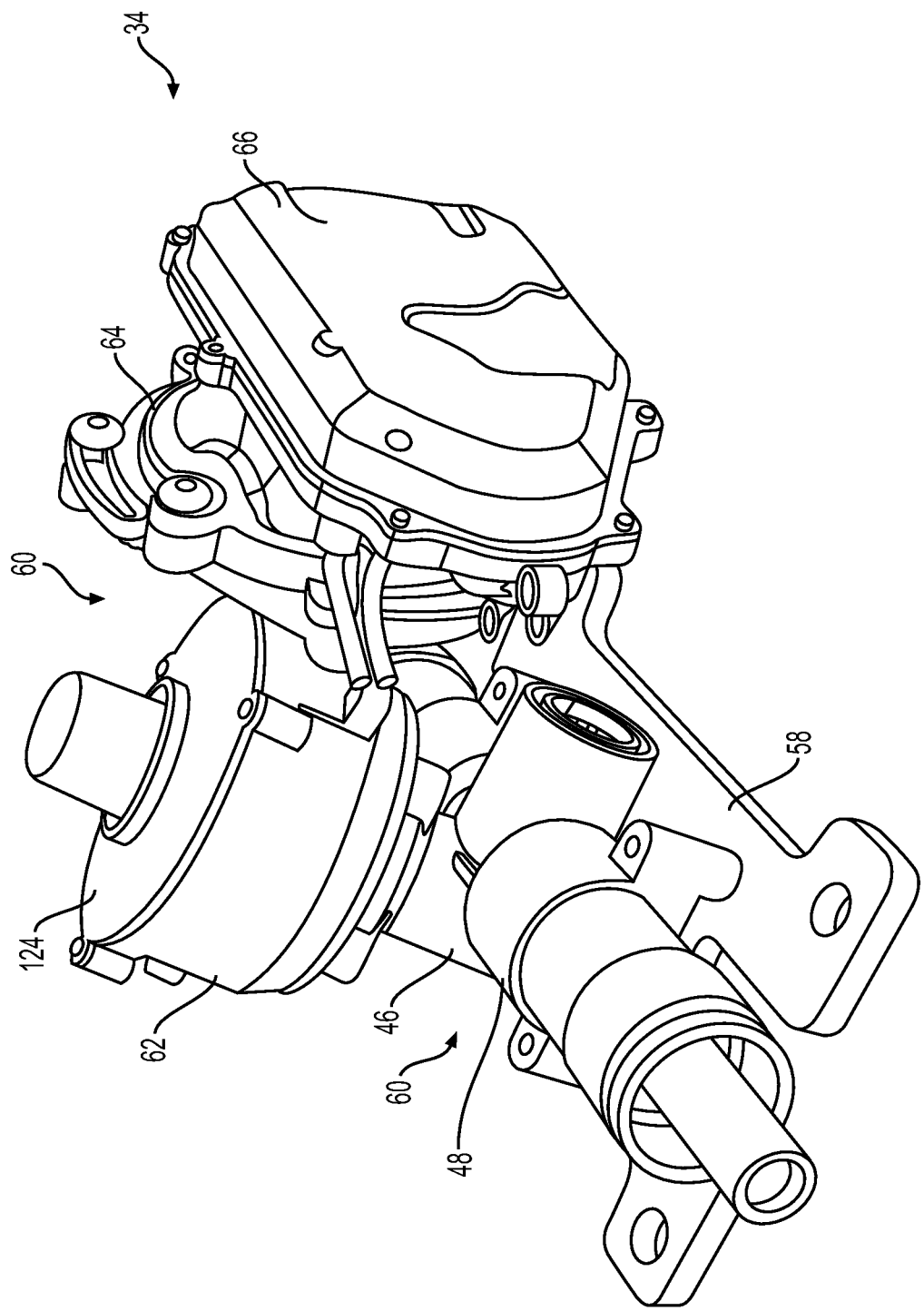
FIG. 3 is a perspective view of the power assist assembly according to the principles of the present disclosure.

With reference now to FIGS. 3 and 4, the power-assist assembly 34 includes a power assist actuator 60 for assisting rotation of the pinion gear 72. The power assist actuator 60 is located in a gear assist housing 62, a motor housing 64, and a controller housing 66. At least a portion of the gear assist housing 62 may be integral and integrally formed with the housing 44. As best illustrated in FIG. 4, a gear assist assembly 68 may be located in the gear assist housing 62. The gear assist assembly 68 may include sprocket gear 70 rotationally connected to the input gear, which may be configured as the pinion gear 72. As described previously, the pinion gear 72 may be mechanically attached to the steering column assembly 26 via connection 36 in a driver interface steering system or electronically connected to the steering column assembly 26 via connection 36 in a steerby-wire (SbW) system. The pinion gear 72 may then be intermeshed with the rack gear 74 for translating movement to the drive axle assembly 40. The rack gear 74 may be formed on a steering rack 75. The gear assist assembly 68 may include an output sensor 76 for sensing the degree of rotations of the input gear 72. A similar input sensor 78 (FIG. 1) may be located near the input device 22, the output device 28, or somewhere along the steering column assembly 26. The output sensor 76 and the input sensor 78 may include any number of configurations for measuring the degree of input and output. For example, the output sensor 76 and the input sensor 78 may be rotation sensors.

With continued reference to FIG. 4, a motor 80 may be located in the motor housing 64 and include a driven gear intermeshed with the sprocket gear 70 to drive (assist) rotation of the input gear 72. More particularly, the motor 80 may include a motor pinion gear 82 that is intermeshed with outer teeth of the sprocket gear 70. As illustrated, the sprocket gear 70 and the input gear 72 may both be coaxially joined and may both include helical teeth. It should be appreciated that the motor pinion gear 82 may also include helical teeth (not shown). It should be appreciated that in other embodiments, the steering assist may be hydraulically driven or driven by other means. In addition, it should be appreciated that the input gear 70 and the rack gear 74 may be configured for front steering or rear steering.

Figure 5:
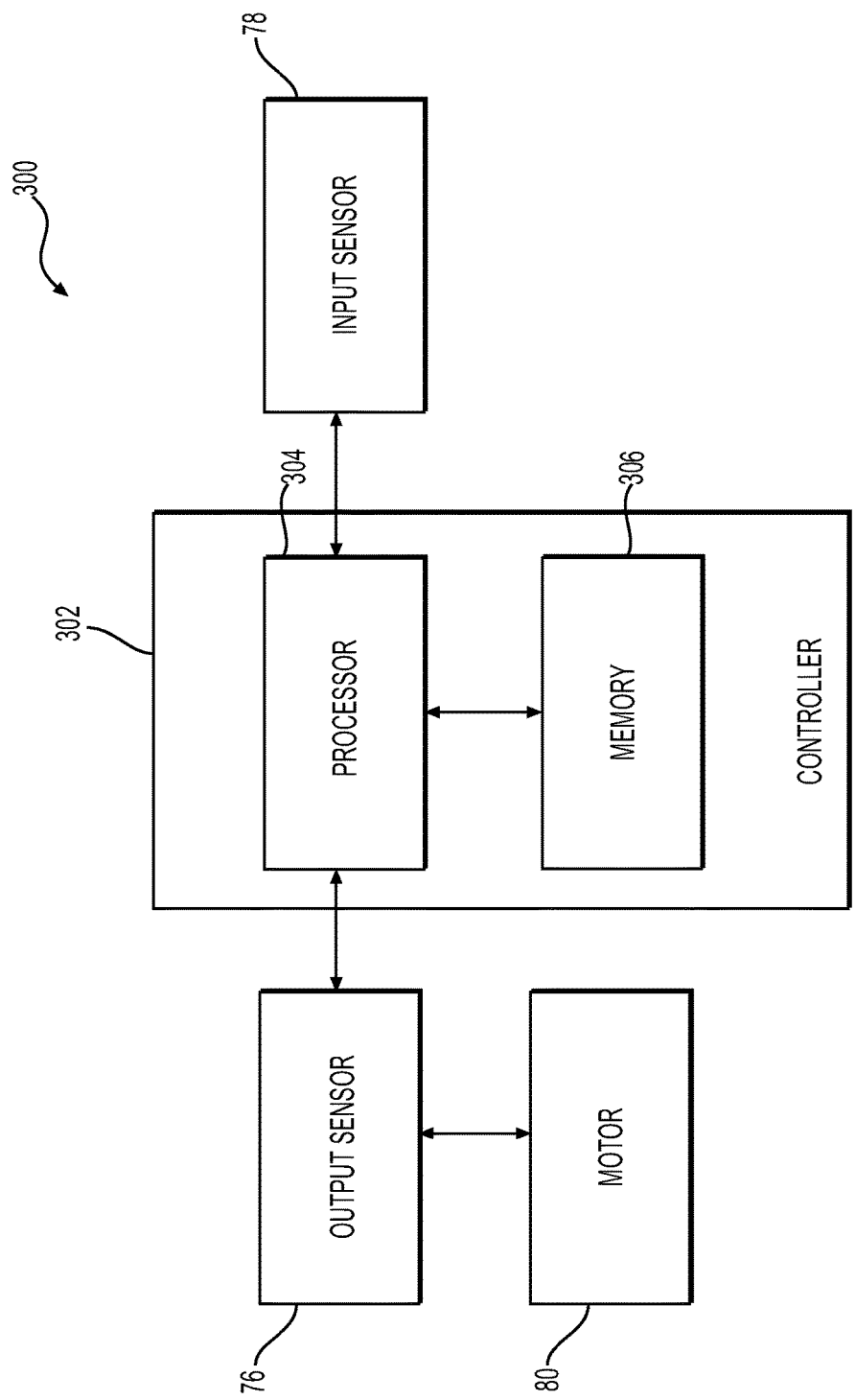
FIG. 5 generally illustrates a block diagram of a controlling system of the power assist assembly.

With reference now to FIGS. 4 and 5, a controller system 300 may be located in the controller housing 66. The controller system 300 may include a controller 302 and the controller 302 may include a processor 304 and a memory 306. The processor 304 may include any suitable processor, such as those described herein. Additionally, or alternatively, the controller 302 may include any suitable number of processors, in addition to or other than the processor 304. The memory 306 may comprise a single disk or a plurality of disks (e.g., hard drives), and includes a storage management module that manages one or more partitions within the memory 306. In some embodiments, memory 306 may include flash memory, semiconductor (solid state) memory or the like. The memory 306 may include Random Access Memory (RAM), a Read-Only Memory (ROM), or a combination thereof. The memory 306 may include instructions that, when executed by the processor 304, cause the processor 304 to, at least, perform the systems and methods described herein. The control system 300 may include or be in communication with the output sensor 76, the input sensor 78, and the motor 80. As such, an input as measured by the input sensor 78 may be received by the processor 304 and cause the processor 304 to instruct a certain output by the motor 80 as measured our otherwise monitored by the output sensor 76.

Figure 6:
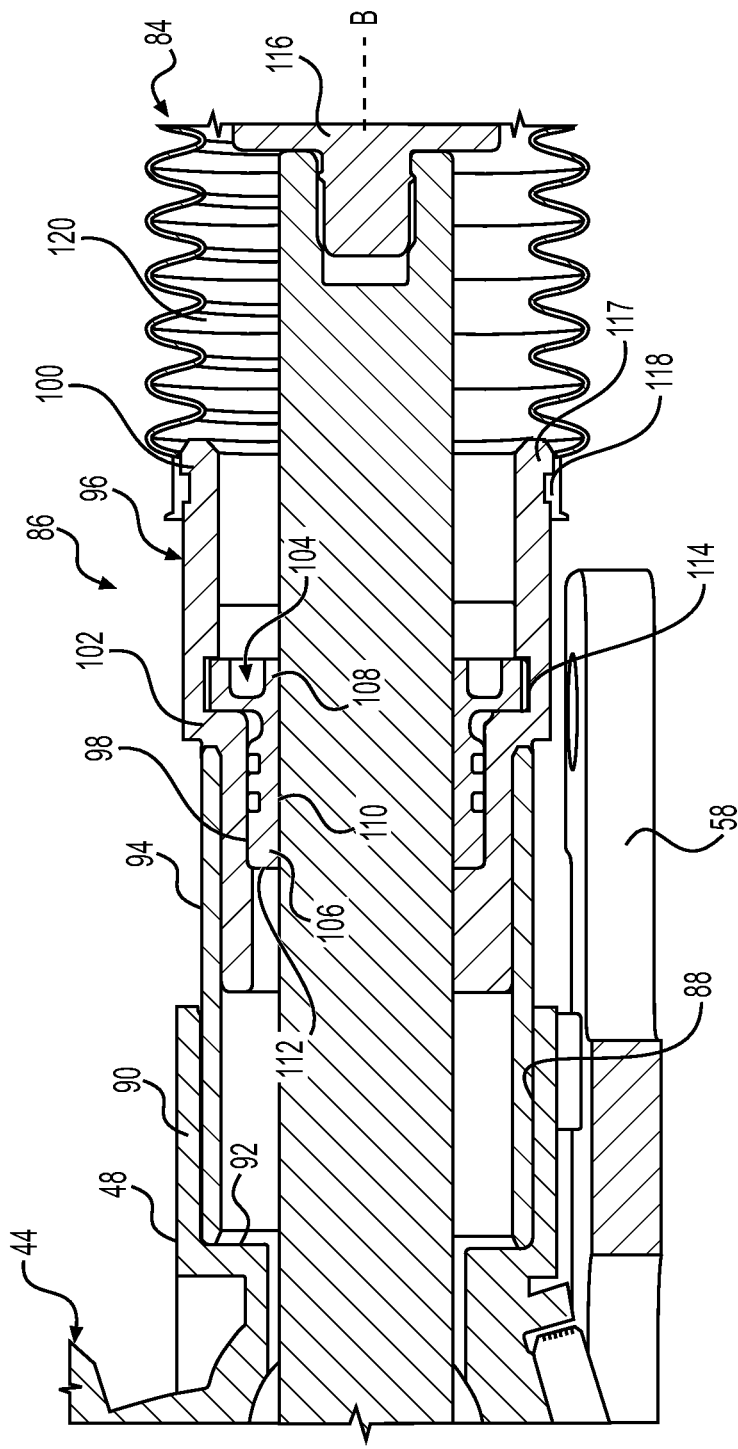
FIG. 6 is cross-sectional view of a boot assembly of the power steering system according to the principles of the present disclosure.

With reference now to FIG. 6, a tie rod assembly 84 is shown. The tie rod assembly 84 may be primarily located within the drive axle portion 48 of the housing 44 and includes the rack gear 72. The tie rod assembly 84 includes at least one boot assembly 86, for example, a boot assembly 86 located on either end or both ends of the drive axle portion 48. More particularly, the drive axle portion 48 may extend between opposite openings 88. The drive axle portion 48 may include an extension sleeve connection end 90 that defines the opening 88 and extends to an abutment surface 92 that extends radially inwardly towards the second axis B. The boot assembly 86 includes an extension tube 94 that extends into the opening 88 and abuts the abutment surface 92 of the extension sleeve connection end 90. The boot assembly 86 further includes a boot sleeve 96 that at least partially extends into the extension sleeve 94 opposite the abutment surface 92. The boot sleeve 96 includes an insertion end 98 and a bushing end 100 that extends radially outwardly from the insertion end 98 at a first step 102 defined by both an exterior and an interior surface of the boot sleeve 96. When the boot sleeve 96 is inserted into the extension sleeve connection end 90, the extension tube 94 abuts the exterior surface of the first step 102. The boot assembly 86 further includes a retainer sleeve 104 at least partially located in the boot sleeve 96. The retainer sleeve 104 includes a body portion 106 and a flange portion 108 on an exterior surface and a bushing surface 110 on an interior surface. The interior surface of the boot sleeve 96 may include a second step 112 for abutment against the body portion 106 of the retainer sleeve 104 and a groove 114 for retaining the flange portion 108 of the retainer sleeve 104 near or at the first step 102. In operation, the steering rack 75 may be in sliding engagement with the bushing surface 110 of the retainer sleeve 104. A tie rod 116 of the tie rod assembly 84 may be connected to an end of the steering rack 75. The boot sleeve 96 further includes a retaining ring groove 117 for connection to a boot retaining ring 118 on the bushing end 102 of the boot sleeve 96, for example, located around the exterior surface thereof. A boot 120 connects to the boot assembly 86 via the boot retaining ring 118. The boot 120 may include a compression sleeve such as a bellows and protect certain components of the boot assembly 86 and the connection between the tie rod 116 and the steering rack 75.

Figure 7:
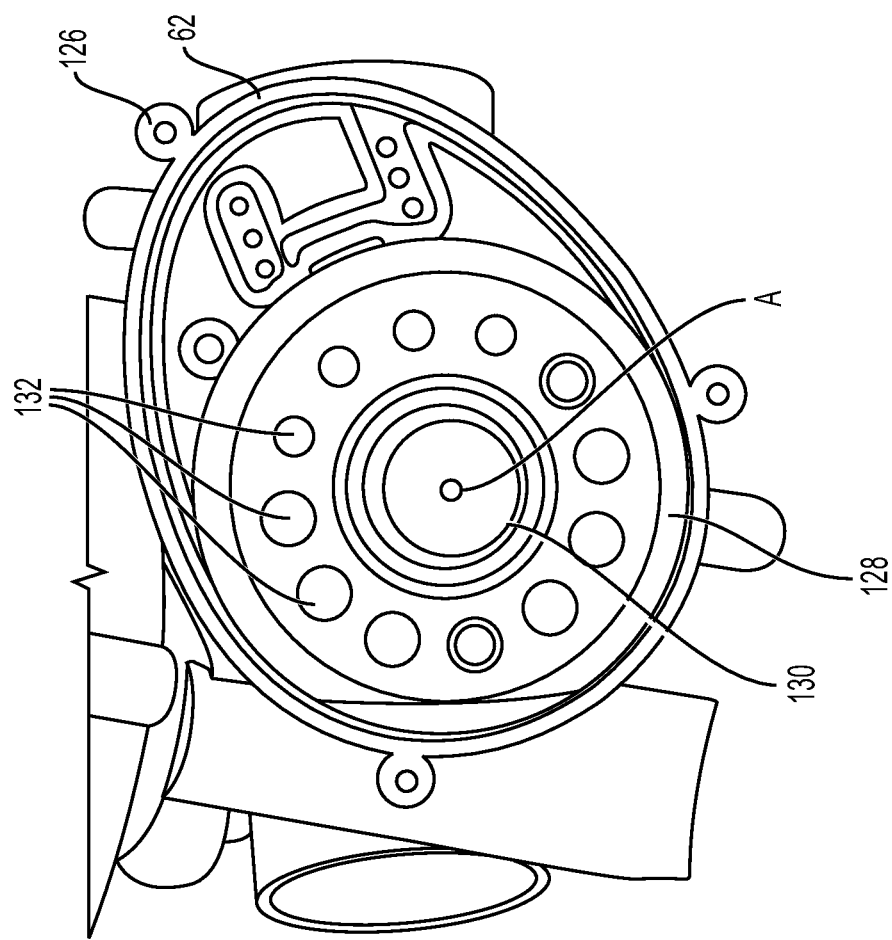
FIG. 7 is a bottom view of a gear assist housing of the power assist assembly with a top cover removed according to the principles of the present disclosure.

With reference now to FIG. 7, a bottom view of the gear assist housing 62 is presented with a top cover 124 (FIG. 3) removed. The gear assist housing 62 includes a series of apertures 126 for attachment of the top cover 124. The gear assist housing 62 includes a pocket 128 for locating the gear assist assembly 68. A surface of the gear assist housing 62 defining the pocket 128 includes an opening 130 that extends about the axis A and receives the input gear 72. The surface of the gear assist housing 62 defining the pocket 128 further includes a plurality of mounting features 132 around the opening 130. The mounting features 132 are circumferentially aligned about the axis A and equally radially distributed. The mounting features 132 may include apertures or integrated connection shafts (e.g., bolts) and the gear assist assembly 68 includes a plurality associated connection features (not shown). The associated connection features may be the same or different in number to the mounting features 132 and include equal circumferential placement about the axis A and an equal radial distribution as the mounting features 132. Accordingly, connections between the mounting features 132 and the associated connection features can be rotationally selected between a plurality of mounting positions between the gear assist assembly and the gear assist housing 62. The plurality of mounting features 132 may include any number of mounting features 132, for example, four or more mounting features, six or more mounting features, eight or more mounting features, twelve or more mounting features, or a different number of mounting features 132. In the exemplary arrangement, the plurality of mounting features 132 includes twelve mounting features 132 distributed every 30° degrees about the axis A for twelve distinct mounting positions.

Figure 9:
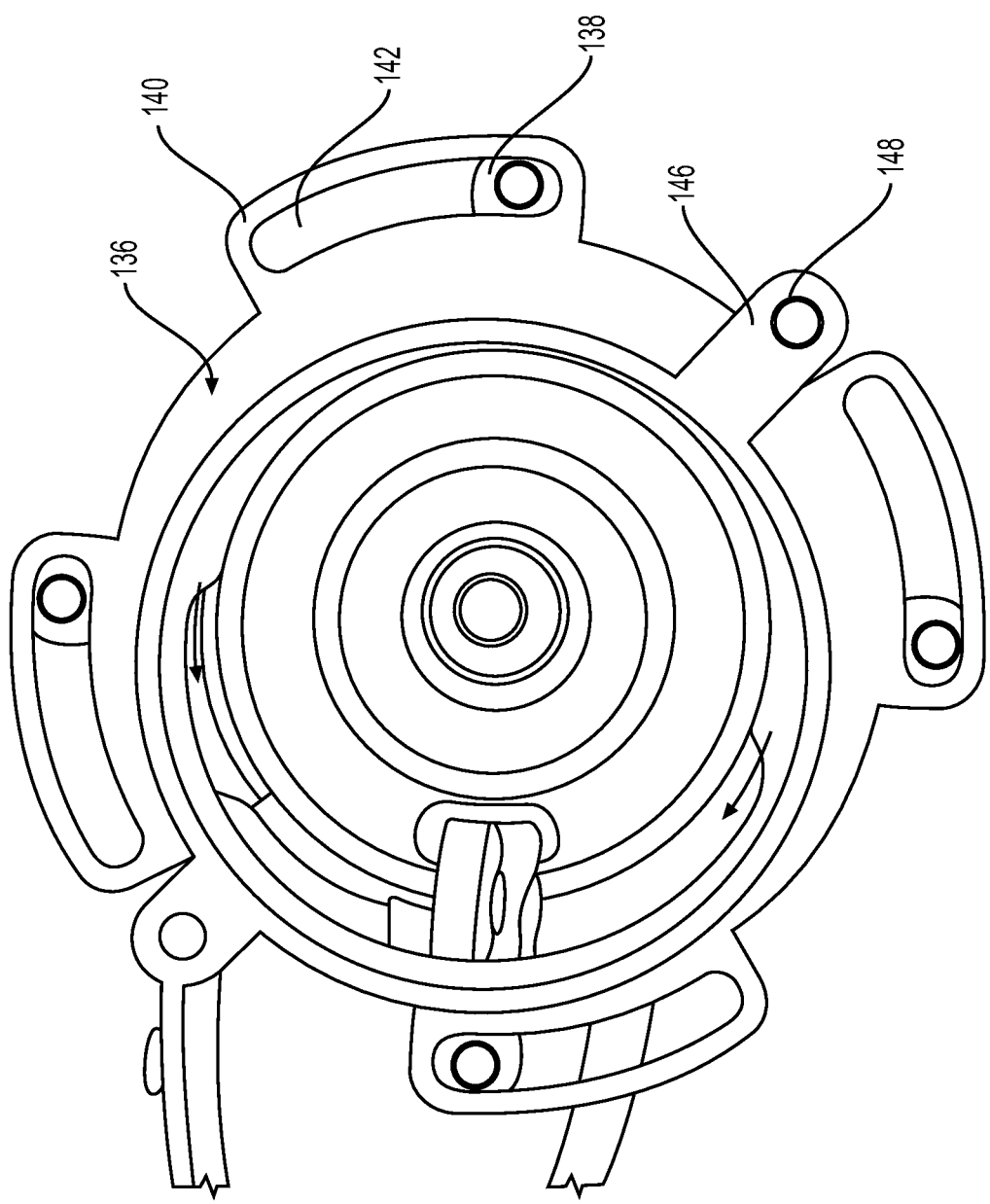
FIG. 9 is a top view of an adapter plate of the power assist assembly according to the principles of the present disclosure.

With reference now to FIGS. 8 and 9, a top view of the power assist assembly 32 is illustrated. An adapter plate 136 connects the motor housing 64 (and by extension, the controller housing 66) to the gear assist housing 62, thus connecting and orienting the motor 80 and controller 300 to the gear assist assembly 68. As best illustrated in FIG. 8, the gear assist housing 62 includes an adapter plate connection opening comprising a plurality of tabs 138 located therearound. The adapter plate 136 includes an annular shape with a plurality of adjustment tabs 140 extending radially outwardly therefrom and corresponding to at least one of the tabs 138 located on the gear assist housing 62. The adjustment tabs 140 each include an elongated slot 142 forming a circumference and the tabs 138 of the gear assist housing include connection apertures 144 spaced along the circumference of the elongated slots 142. In some embodiments, the adapter plate 136 may further include motor housing tabs 146 each defining a motor housing connection aperture 148 for connection to the motor housing 64 to the adapter plate 136. The motor housing connection aperture 148 may be on the same circumference defined by the elongated slots 142. During assembly, the adapter plate 136 may be connected to the motor housing 64 via the motor housing connection apertures 148 and the relative orientation of the motor housing 64 and motor 80 with respect to the gear assist housing 62 may be adjusted in two distinct ways. First, the elongated slots 142 may be oriented with different adjustment tabs 140, i.e., a macro adjustment. Secondly, the adjustment tab 140 may be oriented with respect to its location along the associated elongated slot 142, i.e., a micro adjustment. In some embodiments, there are an equal number of the adjustment tabs 140 and the elongated slots 142. In some embodiments, the plurality of elongated slots 142 includes four elongated slots 132 equally distributed every 90° about the adapter plate 136 for 90° of macro adjustment. In some embodiments, each of the elongated slots 142 may extend 5° or more, 10° or more, 15° or more, 20° or more, 25° or more, 30° or more, 45° or less, or other degrees to provide an equal degree of micro adjustment.

During assembly, the power-assist assembly 34 that is shown and described herein improves upon packaging requirements by providing a plurality of both micro and macro orientational adjustment options during assembly for a desired rack travel, a desired motor orientation, and a desired gear assist assembly orientation. Moreover, a length of the extension tube 94 may be selected to accommodate any inner ball to inner ball dimension and a desired rack travel. Thus the power-assist assembly 34 that is shown and described herein may be adapted to numerous vehicular architectures via selection of extension tube length, the adapter plate 136 orientation, the elongated slot 142 size and placement with respect to the adjustment tabs 140, and the orientation of the gear assist assembly 68 with respect to the mounting features 132. Different orientations may be saved in memory such that the processor is caused to accurately respond to the input sensor 78 via readings from the output sensor 76.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

Having thus described the invention, it is claimed:

1. A power-assist assembly, comprising:
a housing including a drive axle portion extending between a pair of extension sleeve connection ends spaced along an axis for locating a provided steering rack; and
a boot assembly connected to at least one of the extension sleeve connection ends, the boot assembly comprising:
an extension tube connected to the extension sleeve connection end;
a boot sleeve connected to the extension tube and spaced from the extension sleeve connection end of the housing by at least a portion of a length of the extension tube; and
a boot retaining ring connected to the boot sleeve.

2. The power-assist assembly of claim 1, wherein the boot assembly further includes a retainer sleeve located at least partially within the boot sleeve and the retainer sleeve includes an interior bushing surface for sliding engagement with the provided steering rack.

3. The power-assist assembly of claim 2, wherein the at least one extension sleeve connection end with the boot defines an opening defined at least partially by an abutment surface and wherein the extension sleeve is located in the opening and abuts the abutment surface.

4. The power-assist assembly of claim 3, wherein the boot sleeve includes an insertion end and a bushing end that extends radially outwardly from the insertion end, wherein the insertion end is located in the opening and an exterior surface of the bushing end defines a first step for abutment with the extension tube opposite the at least one extension sleeve connection end.

5. The power-assist assembly of claim 4, wherein the retainer sleeve includes a body portion and a flanged portion extending radially outwardly from the body portion, and wherein the flanged portion limits travel of the provided steering rack along the axis.

6. The power-assist assembly of claim 5, wherein an interior surface of the boot sleeve defines a groove and the flanged portion is at least partially located within the groove to prevent axial travel along the axis thereof.

7. The power-assist assembly of claim 6, wherein the interior surface of the boot sleeve further defines a second step in abutment with an end of the body portion of the retainer sleeve along the axis.

8. A method of assembling the power-assist assembly of claim 2, comprising:
determining a desired rack travel limit of the steering rack;
forming the extension tube length to space the boot sleeve from the at least one extension sleeve connection end of the housing; and
connecting the retainer ring to the the at least one extension sleeve connection end of the boot sleeve at the desired rack travel limit.

9. The power-assist assembly of claim 1, wherein the boot sleeve further includes a retaining ring groove on the exterior surface and wherein the boot retaining ring is at least partially located in the retaining ring groove for connecting a provided boot to the power-assist assembly.

10. A power-assist assembly, comprising:
a housing including a drive axle portion extending between a pair of extension sleeve connection ends spaced along a first axis for locating a provided steering rack and an input gear portion extending along a second axis for locating a provided input gear; and a boot assembly connected to at least one of the extension sleeve connection ends, the boot assembly comprising:
- an extension tube connected to the extension sleeve connection end;
- a boot sleeve connected to the extension tube and spaced from the extension sleeve connection end of the housing by at least a portion of a length of the extension sleeve; and
- a boot retaining ring connected to the boot sleeve opposite the extension tube.

11. The power-assist assembly of claim 10, wherein the power-assist assembly further includes a gear assist housing connected to the input gear portion for locating a provided gear assist assembly.

12. The power-assist assembly of claim 11, wherein the power-assist assembly further includes a motor housing for locating a provided motor that drives the provided gear assist assembly.

13. The power-assist assembly of claim 12, wherein the motor housing is connected to the gear assist housing with an adapter plate.

14. The power-assist assembly of claim 13, wherein the adapter plate includes a plurality of elongated slots that are circumferentially aligned and equally spaced around a circumference, and wherein the gear assist housing includes a plurality of fastener apertures, wherein the plurality of apertures are spaced to align with the plurality of elongated slots.

15. A method of assembling the power-assist assembly of claim 14, comprising:
- connecting the motor housing to the adapter plate;
- determining a desired motor orientation between a plurality of available motor orientations between the provided motor and the provided gear assist assembly; and
- rotating the motor housing and adapter plate towards the determined motor orientation and aligning the plurality of elongated slots with the fastener apertures adjacent to the desired motor orientation.

16. The power-assist assembly of claim 13, wherein each one of the plurality of elongated slots extends 45° or less around the circumference.

17. The power-assist assembly of claim 16, wherein the plurality of elongated slots includes at least four elongated slots.

18. A power-assist assembly, comprising:
- a housing including a drive axle portion extending between a pair of extension sleeve connection ends spaced along a first axis and an input gear portion extending along a second axis transverse to the first axis;
- a gear assist housing connected to the input gear portion;
- a steering rack located in the drive axle portion;
- an input gear located in the input gear portion;
- gear assist assembly located in the gear assist housing; and
- a boot assembly connected to at least one of the extension sleeve connection ends, the boot assembly comprising:
  - an extension tube connected to the extension sleeve connection end;
  - a boot sleeve connected to the extension tube and spaced from the extension sleeve connection end of the housing by at least a portion of a length of the extension tube; and
  - a boot retaining ring connected to the boot sleeve opposite the extension tube.

19. The power-assist assembly of claim 18, wherein the gear assist housing includes an interior surface defining a plurality of mounting features distributed equally about a circumference and wherein the gear assist assembly includes a plurality of connection features distributed around the circumference equally to the mounting features, when the mounting features and the connection features can be connected in multiple orientations about the circumference.

20. A method of assembling the power-assist assembly of claim 19, comprising:
- determining a desired gear assist assembly orientation with respect to the gear assist housing;
- rotating the gear assist assembly towards the desired orientation until the mounting features and the connection features are aligned adjacent to the desired gear assist assembly orientation; and
- connecting the mounting features and the connection features.

* * * * *